(12) United States Patent
McLoughlin et al.

(10) Patent No.: US 7,161,329 B2
(45) Date of Patent: Jan. 9, 2007

(54) GENERATOR CONTROLLING SYSTEM

(76) Inventors: John E. McLoughlin, 185 Lincoln Blvd., Hauttauge, NY (US) 11788; Neocles G. Athanasiades, 6 Mayeeck Dr., Setauket, NY (US) 11723; Toh K. Meng, 15 Sunflower Dr., Hauppauge, NY (US) 11788

( * ) Notice: Subject to any disclaimer, the term of this patent is extended or adjusted under 35 U.S.C. 154(b) by 135 days.

(21) Appl. No.: 11/109,598

(22) Filed: Apr. 20, 2005

(65) Prior Publication Data
US 2006/0238170 A1 Oct. 26, 2006

(51) Int. Cl.
*H02P 9/00* (2006.01)
*H02J 1/00* (2006.01)

(52) U.S. Cl. .......................... 322/45; 307/38; 307/29; 322/7; 322/8

(58) Field of Classification Search ................ 290/1 A, 290/2; 322/7, 8, 37, 45, 99; 307/29, 38, 307/39, 40
See application file for complete search history.

(56) References Cited

U.S. PATENT DOCUMENTS

| | | | | |
|---|---|---|---|---|
| 3,842,249 A | * | 10/1974 | Geyer et al. ................ 700/295 |
| 4,347,575 A | * | 8/1982 | Gurr et al. ................... 700/295 |
| 4,419,665 A | * | 12/1983 | Gurr et al. ................. 340/3.21 |
| 4,819,180 A | * | 4/1989 | Hedman et al. ............ 700/291 |
| 5,583,419 A | * | 12/1996 | Haller ............................ 322/8 |
| 5,604,421 A | * | 2/1997 | Barnsley ....................... 322/22 |
| 5,615,105 A | * | 3/1997 | Tofigh et al. ................... 700/9 |
| 5,696,695 A | * | 12/1997 | Ehlers et al. ............... 700/286 |
| 5,754,033 A | * | 5/1998 | Thomson ...................... 322/45 |
| 6,046,513 A | * | 4/2000 | Jouper et al. ................. 307/31 |
| 6,208,038 B1 | * | 3/2001 | Campbell ..................... 307/18 |
| 6,226,305 B1 | * | 5/2001 | McLoughlin et al. ....... 370/532 |
| 6,504,266 B1 | * | 1/2003 | Ervin ........................... 307/29 |
| 6,528,957 B1 | * | 3/2003 | Luchaco ..................... 315/307 |
| 6,621,179 B1 | * | 9/2003 | Howard ....................... 307/38 |
| 6,879,059 B1 | * | 4/2005 | Sleva ........................... 307/38 |

* cited by examiner

*Primary Examiner*—Nicholas Ponomarenko
(74) *Attorney, Agent, or Firm*—Frank L. Hart

(57) ABSTRACT

The operation of a generator and the loads placed on the generator are controlled in response to measuring the loads and generator operating parameters and controllably altering the operating conditions in response to comparison of the measurements to respective set points.

14 Claims, 1 Drawing Sheet

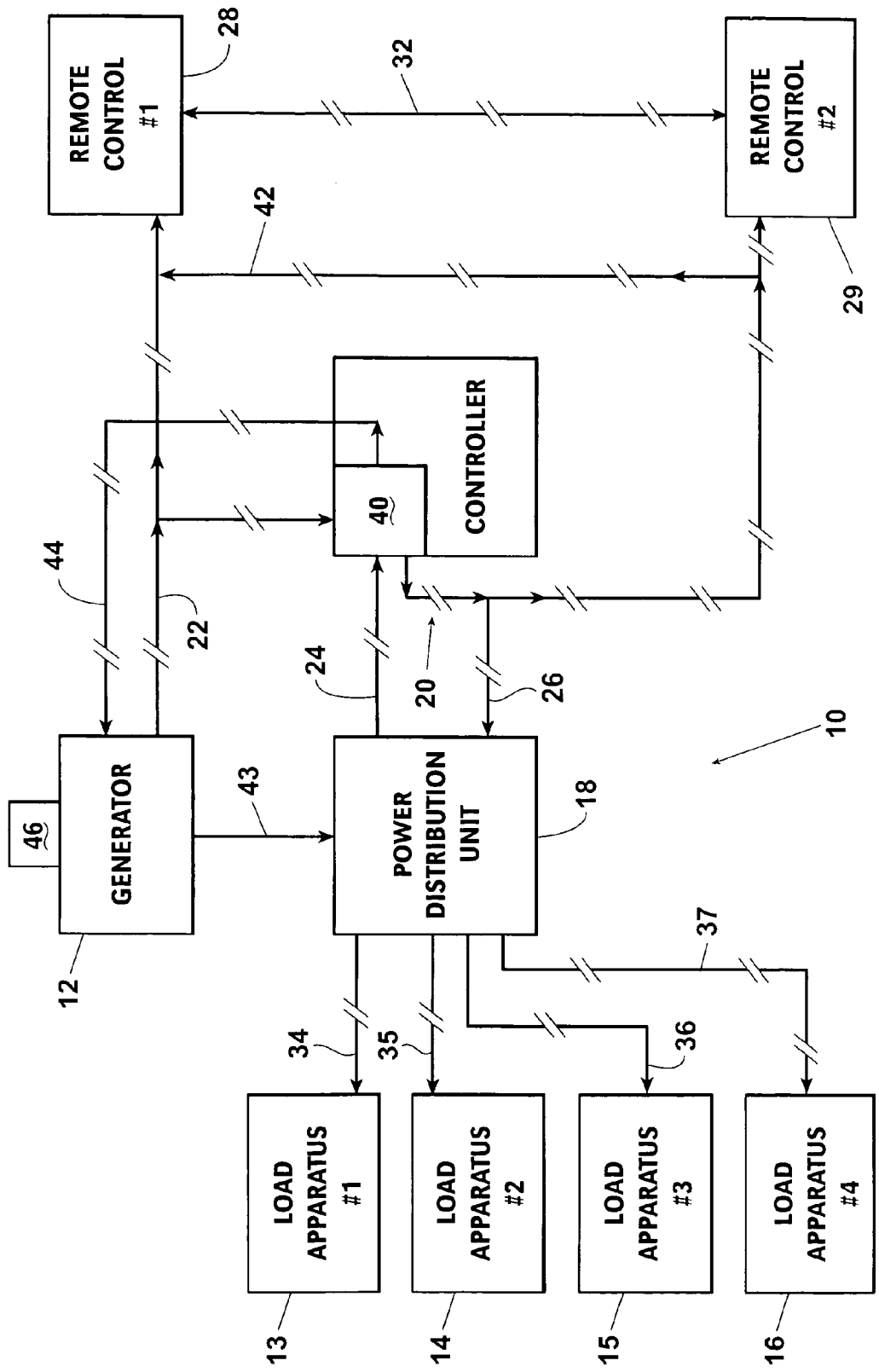

GENERATOR CONTROLLING SYSTEM

CROSS REFERENCE TO RELATED APPLICATIONS

U.S. Pat. No. 6,226,305 B1, issued May 1, 2001 from an application filed by John E. McLoughlin et al, on Nov. 6, 1997, entitled "Apparatus Multiplexing System".

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

The subject invention relates to apparatus for controlling the operation of an electric generator.

More particularly, the subject invention relates to selectively controlling the operation of an electric generator in response to measured generator operating parameter signals and measured load signals.

2. Description of Related Art Including Information Disclosed Under 37 CFR 1.97 and 1.98

Related art is U.S. Pat. No. 6,226,305 B1, issued May 1, 2001 from an application filed by John E. McLoughlin; et al, on Nov. 6, 1997, entitled "Apparatus Multiplexing System".

In the operation of a generator to supply power to various load apparatus it is desirable to prevent damage to the generator or load apparatus by bringing the generator up to speed before any loads are placed on the generator and then most desirable to bring the loads on sequentially and in a preselected order desirably at timed intervals.

The actuation of bringing loads onto the generator are controlled in this apparatus in response to measuring the generator operating parameters, such as voltage, frequency, and temperature for example and finding such parameters to be within acceptable limits.

The apparatus of this invention is also controlled by continuously measuring the various loads placed on the generator and controllably terminating the supply of electricity to each in a preselected sequence and priority when operating problems are detected.

By the utilization of this invention the generator and its associated load apparatus are protected from damage while necessary loads continue to receive power. This represents a saving of equipment, labor, time, and natural resources.

BRIEF SUMMARY OF THE INVENTION

In one aspect of the invention, a generator is connected to a plurality of load apparatus via a power distribution unit and a controller. The generator has apparatus for measuring a plurality of generator operating parameters and delivering operating parameter signals responsive to said measurements. The generator also controllably delivers electrical power to the plurality of load apparatus via the power distribution unit. The power distribution unit has apparatus for continuously measuring the electrical power delivered to each load apparatus and delivering a load signal response to each respective measurement. The controller is adapted to receive generator operating parameter signals and load signals, comparing the signals to respective set points and delivering respective controlling signals to the power distribution unit in response to said comparison.

BRIEF DESCRIPTION OF THE SEVERAL VIEWS OF THE DRAWING(S)

The drawing is a schematic representation of the apparatus of this invention.

DETAILED DESCRIPTION OF THE INVENTION

Referring to the drawing, the generator controlling system 10, of this invention has an electric generator 12, a plurality of load apparatus 13–16, for example, a power distribution unit 18 and a controller 20.

It should be understood that four load apparatus 13–16 are shown for exemplary purposes and that a greater or lesser number can be utilized without departing from this invention. Further, in order to avoid confusion and complexity, most control lines are shown as a single line on the drawing. The control signals can sequentially and continuously be delivered over a single line, as shown, or each respective signal can be deliver by a separate selective line of a line bundle without departing from this invention. The single line is used for descriptive purposes to avoid complexity.

The generator has apparatus for measuring a plurality of operating parameters of the generator and delivering, operating parameter signals responsive to said measurements to the power distribution unit 18 via line 22 to the controller 20. The controller 20 also has the capability to store the data received and provide the operator interface to both download historical data and upload software updates.

The heretofore mentioned plurality of load apparatus 13–16, for example, light, siren and, motor are connected to the generator 12 via power lines 43 and adapted to operate on electrical power received from the generator 12.

The power distribution unit 18 is connected to and controllably delivers power from the generator 12 via power lines 43 to the power distribution unit 18 and then via lines 34–37 to the plurality of load apparatus 13–16 for operating same. The power distribution unit has apparatus for continuously measuring the electrical power deliver to each load apparatus 13–16 and delivering a load signal, via line 24, responsive to each respective measurement.

The controller 20 is connected to the generator 12 and the power distribution unit 18. The controller 20 is adapted to receive generator operating parameter signals, via line 22 and load signals, via line 24, compare the signals to respective set points and deliver respective controlling signals, via line 26, to the power distribution unit 18 and the generator vial line 44 in response to said comparison.

The apparatus of this invention can also have one or more manual operating systems or remote controllers 28,29 connected to the controller 20 and adapted to override the controller 20 and manually actuate and terminate power from the generator 12 to respective load apparatus 13–16, via line 32.

The controller 20 has a priority list and priority selecting apparatus 40. The selecting apparatus 40 receives the respective load signals from the power distribution unit 18, via line 24, compares the load signals to respective set points, deliver a respective priority signal in response to an undesirable load signal relative to its respective set point, compare each priority signal to a preselected priority list and controllably deliver a load apparatus power termination signal, via line 26, to the power distribution unit in a preselected order responsive to the priority list comparison.

The priority selecting apparatus 40 can also be adapted to receive the operating parameter signals from the generator, via line 22, compare each of the operating parameter signals to a respective set point, deliver a respective priority signal in response to an undesirable operating parameter signal comparison to its respective set point, comparing each priority signal to a preselected priority list, and controllably deliver a load apparatus power termination signal, via line 26, to the power distribution unit 18 in a preselected order responsive to the priority list comparison. The controller 20 can also deliver signals via line 44 to the generator 12 to engage or disengage the generator drive.

In some cases, it is desirable for the priority list to contain a termination block on one or more load apparatus 13–16, for power termination signals and operating parameter signals. Such termination blocks can be used to prevent power shut down to load apparatus 13–16 which are essential. Examples of essential load apparatus would be extraction tools, and lights which might be used in a ambulance or fire rescue vehicle to rescue or sustain a injured persons life.

Such blocks can be used during initial start up signal from the generator 12 for blocking all power delivered by the generator 12 until the comparison of each of the operating parameter signals to their respective set point is within desirable limits and then permit the deliver of power to the plurality of load apparatus 13–16, via the power distribution unit 18, in a preselected order. Such power can be controllably delivered consecutively to the plurality of load apparatus in a particular sequence at preselected timed intervals.

It should be noted that the various parameter and load signals are delivered, via line 42, to each remote manual operating system or remote controller where they can be observed by an operator and caused to deliver overriding operating signals, via line 32 when desired.

The invention claimed is:

1. In a generator controlling system having apparatus for measuring a plurality of operating parameters of the generator and delivering operating parameter signals responsive to said measurements to a controller and a plurality of load apparatus adapted to operate on electrical power received from the generator, the improvement comprising:
    a power distribution unit connected to and controllably delivers power from the generator to the plurality of load apparatus, said power distribution unit having apparatus for continuously measuring the electrical power delivered to each load apparatus and delivering a load signal responsive to each respective measurement; and
    a controller connected to the generator and to the power distribution unit; said controller being adapted to receive generator operating parameter signals and load signals, comparing the signals to respective set points and delivering respective controlling signals to the power distribution unit in response to said comparison.

2. A generator controlling system, as set forth in claim 1, including a first remote controller connected to the controller and being adapted t manually actuate and terminate power from the generator to respective load apparatus via said power distribution unit.

3. A generator controlling system, as set forth in claim 2, including a second remote controller remotely positioned from said first remote controller, said second manual operating system being adapted to manually actuate and terminate power from the generator to respective selected load apparatus via said power distribution unit.

4. A generator controlling system, as set forth in claim 1, wherein the controller includes priority selecting apparatus adapted to receive the respective load signals from the power distribution unit, comparing the load signals to respective set points, deliver a respective priority signal in response to an undesirable load signal relative to its respective set point, comparing each priority signal to a preselected priority list and controllably delivering a load apparatus power termination signal to the power distribution unit in a preselected order responsive to the priority list comparison.

5. A generator controlling system, as set forth in claim 4, wherein the priority list contains a termination block on at least one load apparatus.

6. A generator controlling system, as set forth in claim 4, wherein the priority list contains a termination block on a plurality of load apparatus.

7. A generator controlling system, as set forth in claim 4, wherein the priority selecting apparatus is adapted to receive the operating parameter signals from the generator, compare each of the operating parameter signals to a respective set point, deliver a respective priority signal in response to an undesirable operating parameter signal comparison to its respective set point, comparing each priority signal to a preselected priority list and controllably deliver a load apparatus power termination signal to the power distribution unit in a preselected order responsive to the priority list comparison.

8. A generator controlling system, as set forth in claim 7, wherein the priority list contains a termination block on at least one load apparatus.

9. A generator controlling system, as set forth in claim 7, wherein the priority list contains a termination block on a plurality of load apparatus.

10. A generator controlling system, as set forth in claim 7, wherein the priority selecting apparatus receives a initial start up signal from the generator, blocks all power delivered by the generator until the comparison of each of the operating parameter signals to their respective set point is within desirable limits and controllably delivers power to the plurality load apparatus in a preselected order.

11. A generator controlling system, as set forth in claim 10, wherein the power is delivered consecutively to the plurality load apparatus at preselected timed intervals.

12. In a generator controlling system, as set forth in claim 1, wherein the controller is adapted to signal the generator and terminate mechanical driving of the generator.

13. In a generator controlling system, as set forth in claim 12, wherein the controller is adapted to signal the generator and actuate mechanical driving of the generator.

14. In a generator controlling system, as set forth in claim 1, wherein the controller is adapted to signal the generator and actuate mechanical driving of the generator.

* * * * *